No. 608,210. Patented Aug. 2, 1898.
C. N. McCOY.
VEHICLE WHEEL.
(Application filed June 15, 1897.)
(No Model.)
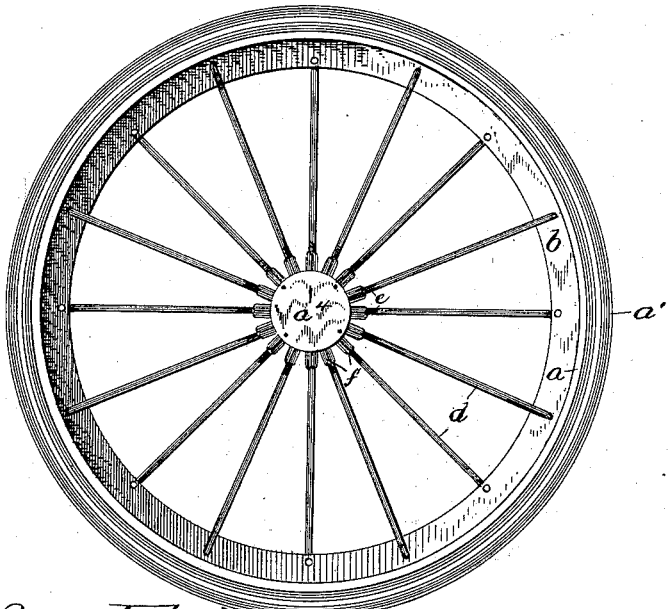
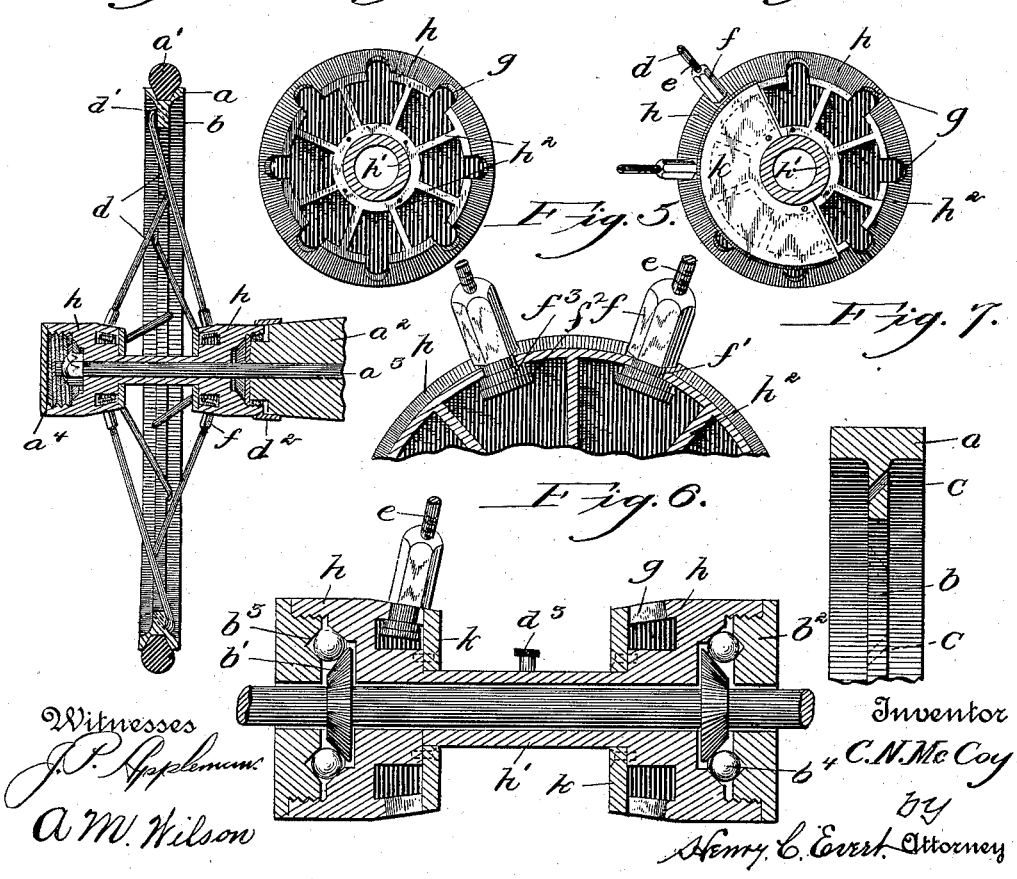

UNITED STATES PATENT OFFICE.

CHARLES N. McCOY, OF DEHAVEN, PENNSYLVANIA.

VEHICLE-WHEEL.

SPECIFICATION forming part of Letters Patent No. 608,210, dated August 2, 1898.

Application filed June 15, 1897. Serial No. 640,809. (No model.)

*To all whom it may concern:*

Be it known that I, CHARLES N. MCCOY, a citizen of the United States of America, residing at Dehaven, in the county of Allegheny and State of Pennsylvania, have invented certain new and useful Improvements in Vehicle-Wheels, of which the following is a specification, reference being had therein to the accompanying drawings.

This invention relates to certain new and useful improvements in knockdown wheels for bicycles, velocipedes, and various vehicles, and has for its object to construct a wheel whereby any one of the spokes may be easily removed without detaching the tire or rim from the wheel, and it also aims to construct a wheel so arranged that it will be practically impossible to dish the same.

The invention further aims to construct a wheel of this nature which when employed for a bicycle, velocipede, or wheel of like description may be constructed with ball-bearings, so as to reduce the friction to a minimum, and when employed for carriages and like vehicles the wheel may be constructed with or without the ball-bearings, as may be desired.

A further object of the invention is to so construct a wheel as to allow for the expansion and contraction of the spokes in a manner that the wheel will not be drawn out of a true line, as is often the case with the ordinary construction of bicycle and velocipede wheels.

The invention further aims to construct a wheel that will be simple, comparatively cheap to manufacture, strong, durable, and effectual in the performance of all its functions.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a front elevation of my improved wheel, showing same equipped with rubber tire. Fig. 2 is a vertical sectional view of the same. Fig. 3 is a cross-sectional view of the hub. Fig. 4 is a similar view showing one-half of the washer in position for holding the spokes in engagement with the hub. Fig. 5 is a sectional view of a portion of the hub, showing two of the nipples which hold the spokes in position in engagement therewith. Fig. 6 is a longitudinal sectional view of the hub. Fig. 7 is a cross-sectional view of a portion of the wheel-rim.

Referring now to the drawings by reference-letters, $a$ represents the rim, which is provided with an inwardly-projecting flange $b$, having inclined apertures $c$ extending therethrough and entirely around the said flange, every other one of said apertures being in a line and having the same inclination, so that every other spoke will engage in the opposite side of the hub. These spokes $d$ are provided with hub ends $d'$, which engage the said apertures, and at their lower ends are provided with screw-threads $e$, which engage in nipples $f$, having a shank $f'$ and a head $f^2$. These shanks $f'$ are adapted to engage in recesses $g$, provided in the box $h$, which, together with the intermediate portions $h'$, form the hub and are held in engagement therewith by means of washers $k$, formed in two pieces, so that the same may be placed in position after the hub has been cast.

In Fig. 2 I have shown the wheel as constructed for a vehicle-wheel, such as carriages and the like, in which the rim $a$ is provided with a circumferential groove adapted to receive the rubber tire $a'$, the inner box $h$ of the hub engaging onto the axle $a^2$ by means of screw-threads and a spindle $a^3$ engaging through the hub where it is secured in the outer box $a$ of the wheel. A covering-plate $a^4$ may be provided over this outer box and suitably secured thereto, and it will be observed that in this construction provision is made in the box of the hub for ball-bearings, if so desired, and in Fig. 6 I have shown the hub constructed with the ball-bearings, the general arrangement of the hub being the same and the spindle $a^3$ having cone-bearings $b'$, the box being closed by means of bearing-blocks $b^2$, having a V-shaped groove $b^3$, which, together with cones $b'$, forms the bearings for the balls $b^4$. In any construction of a wheel, whether for velocipede or wheel for carriages and like vehicles, I prefer to provide a gasket $f^3$, which may be composed of rubber or other resilient material and is placed upon the shank $f'$ between the head $f^2$ and the inner face of the box $h$, which construction will allow for the expansion and contraction of the spokes. This box $h$ may be strengthened by means of ribs $h^2$, as is shown throughout the drawings. By this construction of the wheel it will be observed that in case of a broken spoke the washers $k$ may be readily detached, when by turning the nipples $f$ the spoke may be readily detached from the wheel and a new one inserted without loosening or removing any of the other spokes of the wheel, and by reason of the other spokes inclining in the same direction a rigid brace is given to the wheel, which will prevent any possibility of dishing the same.

In Fig. 2 I have shown a band $d^2$, encircling the connection of the inner box $h$, with the axle $h^2$, which will serve to hide this connection, and in Fig. 6 I have shown an oil-cup $d^3$, provided in the intermediate portion $h'$, feeding oil to the spindle $a^3$.

The operation will, it is thought, be understood from the drawings and from the foregoing description.

It will also be noted that various changes may be made in the details of construction without departing from the general spirit of my invention.

Having fully described my invention, what I claim as new, and desire to secure by Letters Patent, is—

1. In a wheel, a hub consisting of two receiving-boxes, an intermediate portion of less diameter than said receiving-boxes, and formed integral therewith, screw-threaded bearing-blocks engaging the ends of said receiving-boxes, and provided with V-shaped grooves, recesses formed in the rear of said receiving-boxes, nipples engaging said recesses, each of said nipples being provided with a shank, a head formed on the end of the shank, a resilient gasket engaging said shank and operating against the inside of said receiving-boxes, a sectional washer secured to said receiving-box, whereby said nipples are secured in the recesses, screw-threaded spokes engaging the nipples, the opposite ends of said spokes being provided with hooked ends, engaging an inwardly-projecting flange formed integral with the rim, substantially as shown and described.

2. In a wheel, a hub consisting of the two boxes $h$, an intermediate portion of less diameter than said boxes $h$, and formed integral therewith, recesses formed in the rear portion of said boxes, nipples engaging said recesses, said nipples being formed with a shank $f'$ and a head $f^2$ formed on the end thereof, a resilient gasket engaging said shank and operating against the inner face of the box $h$, spokes secured in the nipples, the opposite ends of said spokes engaging an inwardly-projecting flange formed integral with the rim, a screw-threaded bearing-block engaging the ends of said box $h$ and provided with a V-shaped groove, and suitable bearings for the axle engaging said groove, substantially as shown and described.

In testimony whereof I affix my signature in presence of two witnesses.

CHARLES N. McCOY.

Witnesses:
JOHN NOLAND,
GEO. B. PARKER.